United States Patent [19]

Yan

[11] 4,296,075
[45] Oct. 20, 1981

[54] METHOD FOR PROTECTING AN ION-EXCHANGE RESIN FROM CHEMICAL POISONING

[75] Inventor: Tsoung-yuan Yan, Philadelphia, Pa.

[73] Assignee: Mobil Oil Corporation, New York, N.Y.

[21] Appl. No.: 963,661

[22] Filed: Nov. 24, 1978

[51] Int. Cl.³ ............................................. C01G 43/00
[52] U.S. Cl. ......................................... 423/7; 423/17; 299/4; 210/682
[58] Field of Search ......................... 423/7, 15, 16, 17; 299/4; 210/29, 38 C

[56] References Cited

U.S. PATENT DOCUMENTS

| | | | |
|---|---|---|---|
| 4,098,691 | 7/1978 | Filby | 210/29 |
| 4,108,722 | 8/1978 | Stover | 423/17 |
| 4,155,982 | 5/1979 | Hankin et al. | 423/7 |
| 4,200,337 | 4/1980 | Jackovitz et al. | 423/7 |

FOREIGN PATENT DOCUMENTS

| | | | |
|---|---|---|---|
| 2757208 | 7/1978 | Fed. Rep. of Germany | 423/7 |
| 910025 | 11/1962 | United Kingdom | 423/7 |
| 1115797 | 5/1968 | United Kingdom | 423/7 |

*Primary Examiner*—Edward A. Miller
*Attorney, Agent, or Firm*—Charles A. Huggett; Michael G. Gilman; James F. Powers, Jr.

[57] ABSTRACT

A method for protecting an ion-exchange resin in a uranium and/or related values recovery operation from poisoning by polythionates contained in the leach solution. A guard chamber containing a catalytic material is positioned in the leaching circuit upstream of the resin so the leach solution will pass through the catalytic material before it contacts the resin. The catalytic material, e.g. activated carbon, converts the polythionates to non-poisoning thiosulfates, sulfites, and water which offer no poisoning threat to the resins. An oxidant, e.g. oxygen, is added to the leach solution before it passes through the catalytic material to speed up the catalytic reaction.

7 Claims, 1 Drawing Figure

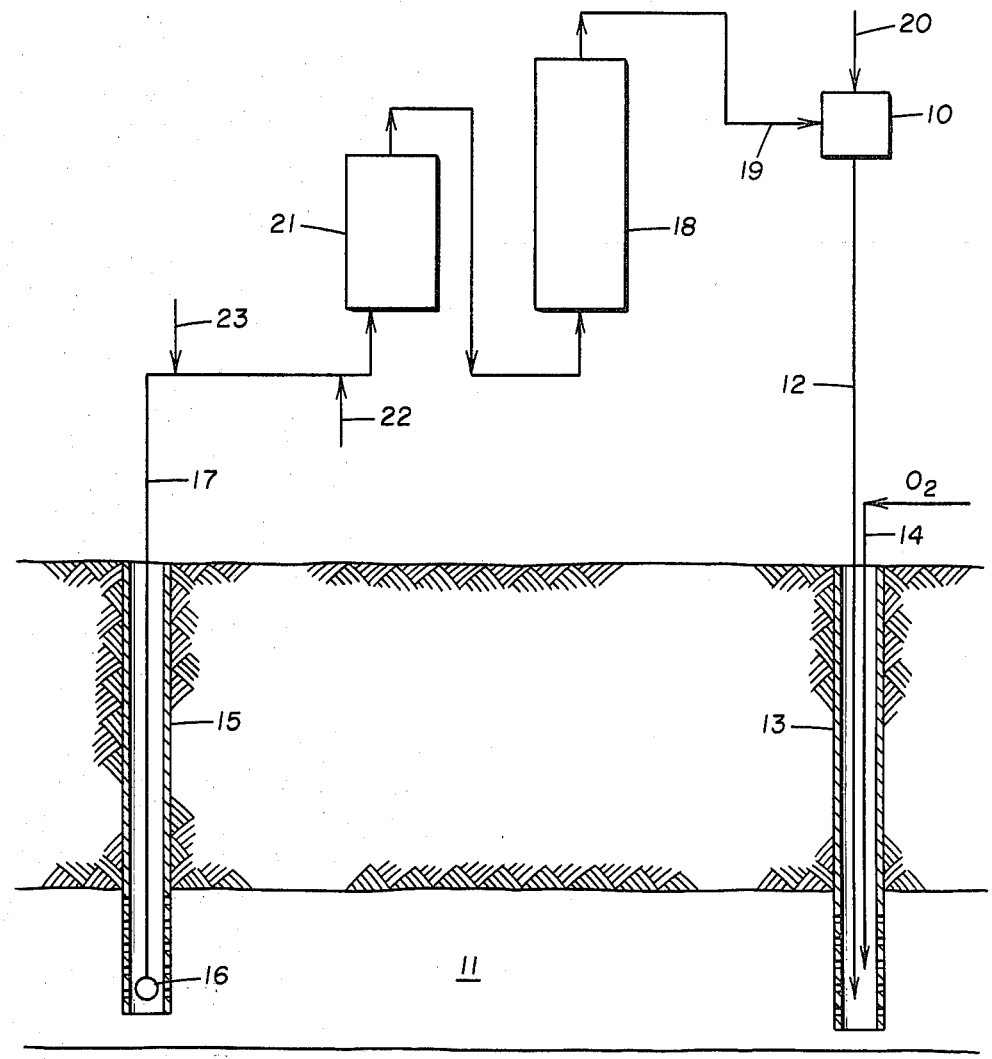

METHOD FOR PROTECTING AN ION-EXCHANGE RESIN FROM CHEMICAL POISONING

BACKGROUND OF THE INVENTION

The present invention relates to a method and apparatus for recovering uranium and/or related values from an ore, either at the surface or in situ. More particularly, the present invention relates to a method and apparatus for protecting the ion-exchange resins in a uranium recovery operation from poisoning by certain oxidized sulfur compounds normally found in typical leach solutions.

In a typical uranium recovery operation, uranium-bearing ore (either mined or in situ) is contacted with a leach solution which oxidizes and dissolves the uranium values from the ore. The pregnant leach solution is then flowed through one or more columns containing a strong base, anionic, ion-exchange resin which adsorbs the uranium values from the leach solution. When the resin in a column is sufficiently loaded with uranium values, the flow of leach solution is switched to another column and a second solution or eluant is flowed through the loaded column to desorb the uranium values into the eluant, now called the eluate when loaded with uranium values. Due to the eluant composition, the concentration of uranium values in the eluate will be greater than was the concentration in the leach solution. The eluate is then processed to recover the uranium values.

However, in operations of this type, as the leach solution (e.g. a carbonate solution and an oxidant) passes through the ore, not only are the uranium values oxidized but, also, sulfur and/or sulfur compounds (e.g. elemental sulfur, pyrites, hydrogen sulfice, et al) in the ore are oxidized to both sulfate compounds and intermediate sulfur oxide compounds (e.g. polythionates, thiosulfates, and sulfites). These oxidized sulfur compounds will dissolve along with the uranium values into the leach solution and will be produced therewith to the surface.

When the leach solution is flowed through the ion-exchange resin to remove the uranium values, some of the oxidized sulfur compounds will also be adsorbed onto the resins. The normal elution of the resin to remove the uranium values will also remove most of these sulfur compounds. It is known, however, that polythionates are more strongly adsorbed on commercially available, anionic resins and will not be readily removed by standard elution. This chemical "poisoning" of the resin caused by polythionate adsorption will continue to build with each loading and elution cycle until the uranium loading capacity of the resin becomes too low in a commercial recovery operation.

In present commerial operations, when the resin becomes substantially poisoned with polythionates, it must be regenerated to remove the poison. This is now commonly accomplished by flushing the resin with a concentrated caustic solution. Not only is this regeneration procedure expensive and time consuming, but, more importantly, the use of the concentrated caustic solution leads to the destruction and/or defunctionalization of the resin thereby significantly reducing the operational life of the very expensive resin.

In view of the above, it is obvious that a need exists for a simpler and more efficient method to protect the resin from poisoning by the oxidized sulfur compounds normally found in the leach solution.

SUMMARY OF THE INVENTION

The present invention provides a method and apparatus for protecting an ion-exchange resin used to adsorb uranium and/or related values from a leach solution from poisoning by polythionates also contained in the leach solution.

More specifically, a guard chamber is positioned upstream from the ion-exchange resin so the leach solution will flow through the guard chamber before it passes through the resin. A catalytic material is positioned in the guard chamber which is effective to convert the polythionates in the leach solution to thiosulfates, sulfites, and water, none of which will be strongly adsorbed on the resin when the leach solution passes through the resin and none of which presents a poisoning hazard to the resin. Examples of catalytic materials which can be used are activated carbon, and platinum or palladium deposited on a porous base material such as activated carbon or alumina.

To increase the catalytic reaction rate, an oxidant, e.g. oxygen or hydrogen peroxide, is added to the leach solution before it passes through the catalytic material.

BRIEF DESCRIPTION OF THE DRAWING

The FIGURE is a schematic view, partly in section, of a typical leach operation for recovering uranium and/or related values incorporating the present invention.

DESCRIPTION OF THE PREFERRED EMBODIMENTS

Referring more particularly to the drawing, the FIGURE discloses a typical uranium and/or related values recovery operation utilizing the present invention to protect the ion-exchange resin. A leach solution, e.g. carbonate solution, is made up in tank 10 and injected into a uranium-bearing formation 11 through line 12 in injection well 13. As understood in the art an oxidant (e.g. hydrogen peroxide) can be mixed with the leach solution in tank 10 or the oxidant (e.g. oxygen) can be injected and mixed downhole by means of line 14.

As the leach solution and the oxidant flows through formation 11, the uranium values are oxidized and will dissolve into the leach solution. Unfortunately, other components in the formation such as sulfur and its related compounds are also oxidized to a soluble state. For example, elemental sulfur, pyrite, hydrogen sulfide are oxidized to both sulfate ($SO_4^=$) compounds and to intermediate sulfur oxide compounds, namely, polythionates, thiosulfate, and sulfite. These sulfur compounds also dissolve into the leach solution and are produced with the pregnant leach solution to the surface through line 17 by means of pump 16 in production well 15.

In typical, known recovery operations, the produced pregnant leach solution is flowed through column 18 which contains an anionic ion-resin, e.g. quaternary amine resin, which adsorbs the uranium values from the leach solution. The leach solution, now stripped of the uranium values, is flowed through line 19 to tank 10 where the necessary chemicals are added through line 20 to make up fresh leach solution for reuse in the recovery operation.

Where the leach solution also contains sulfur compounds as mentioned above, many of these sulfur compounds will be selectively adsorbed onto the resin along with the uranium values. Some of the adsorbed sulfur compounds will be removed along with the uranium values during normal elution of the resins but others, e.g. polythionates, which are more strongly adsorbed, will not be readily removed from the resin during elution. Any unremoved polythionates continue to build up over several loading and elution cycles and will "poison" the resin by decreasing the uranium loading capacity of the resin. Currently, in operations of this type, when this poisoning becomes severe, the resin is regenerated by specially treating it to remove the polythionates.

A typical known regeneration procedure of a poisoned resin is to flush or elute the resin with a 5% to 10% caustic solution which produces the following reaction:

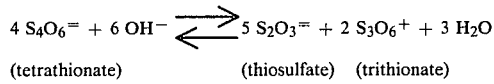

(tetrathionate)   (thiosulfate)   (trithionate)

The trithionate and thiosulfate remain in the resin but are then removed by treatment with salt and/or carbonate solutions. Sulfur is slowly converted to polysulfide by the caustic treatment and then displaced by chloride. This is an expensive and tedious procedure. In addition, treatment using such a concentrated caustic solution also leads to destruction or defunctionalization of resin, thereby severely shortening the operational life of the very expensive resin.

In accordance with the present invention, the operational life of ion-exchange resin is extended by protecting the resin from poisoning by sulfur compounds, e.g. polythionate, wherein no harsh regeneration steps are needed. A guard chamber 21 is positioned in the leaching circuit so that the produced, pregnant leach solution will flow through guard chamber 21 before it passes into column 18. Guard chamber 21 contains a catalytic material which is effective to convert polythionates in the leach solution into elemental sulfur and thiosulfates at a high rate. Some lower order polythionate may also be formed, but the catalytic action of the material in guard chamber will further reduce these lower order polythionates to thiosulfates, sulfites, and water. For example, where the poisoning polythionate in the leach solution is tetrathionate (believed to be the most predominatnt polythionate poison) the reactions occurring in guard chamber 21 are believed to be as follows:

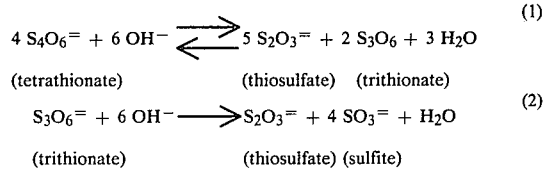

(tetrathionate)   (thiosulfate)   (trithionate)

(trithionate)   (thiosulfate) (sulfite)

Any sulfur produced by the catalytic reaction is in the form of a colloid and passes through the ion-exchange resin readily without ion exchange. The thiosulfate and sulfites present in the leach solution as it passes through column 18 will be exchanged and retained in the resin during the loading cycle but will be easily removed from the resin by the regular eluant (e.g. HCl/NaCl or $NaHCO_3/Na_2CO_3/NaCl$) during the elution cycle.

Any catalytic material which is effective to convert polythionates into nonpoisoning sulfur compounds, e.g. thiosulfates and sulfites, can be used in guard chamber 21. Examples of such catalytic materials are activated carbon and noble metals such as platinum or palladium. Due to the costs involved in using the noble metals, it is preferred to deposit the selected metal on a porous base material such as activated carbon or alumina to form the desired catalytic material.

The reaction of converting poisonous polythionate may be improved by adding an oxidant to the leach solution before the leach solution passes through catalytic material in guard chamber 21. Oxygen can be added to the leach solution through line 22 or hydrogen peroxide can be added to the leach solution through line 23 before it reaches chamber 21. Where hydrogen peroxide is used, the catalytic material in guard chamber 21 will convert the hydrogen peroxide upon contact into oxygen and water. For a complete description of this reaction see copending U.S. application Ser. No. 963,662, filed Nov. 24, 1979.

Any excess oxygen remaining in the leach solution after it leaves guard chamber 21 will pass through column 18 innocuously. This permits amounts of oxidant to be used which are greatly in excess of the stoichiometric amounts. Where oxygen is used, up to as much as a hundred times the stoichiometrical amount can be used without ill effect. Further, since the solubility of air is an aqueous solution is 8 parts per million of oxygen, bubbling of air or $O_2$ into the leach solution at guard chamber 21 will be sufficient to supply the necessary oxidant. Where hydrogen peroxide is added through line 23, it can be added in excess up to ten times the stoichiometrical amount, e.g. 10 ppm, for a typical operation without any harmful side effects.

The catalytic reaction of the polythionate conversion is facilitated at higher pH values lying in the range between 5 and 10, preferably between 6 and 8. Most known leach solutions have a pH within this range and need not be adjusted before passing through guard chamber 21.

Even though it may become necessary from time to time to regenerate the catalytic material to restore its activity, this can easily be done by merely flushing the catalytic material with caustic or acid solutions with or without salt.

It can be seen from the above that the present invention provides a method and apparatus for continuously protecting the ion-exchange resin in a uranium recovery operation from poisoning due to polythionate in the leach solution. By preventing the polythionates from being adsorbed onto the resin, the need for the harsh and expensive regeneration of the resin to remove the polythionates is eliminated thereby effectively extending the operational life of the resin and significantly reducing the costs of the recovery operation.

I claim:

1. A method for protecting an ion-exchange resin used for adsorbing uranium and/or related values from a leach solution from poisoning caused by polythionates in the leach solution, the method comprising:

passing the leach solution through a catalytic material before passing the leach solution through said resin, said catalytic material converting said polythionates in the leach solution into non-poisoning thiosulfates, sulfites, and water.

2. The method of claim 1 wherein said catalytic material comprises:

activated carbon.

3. The method of claim 1 wherein said catalytic material comprises:

platinum deposited on a porous base material.

4. The method of claim 3 wherein said catalytic material comprises:

palladium deposited on a porous base material.

5. The method of claim 1 further including:

adding an oxidant to the leach solution before said leach solution passes through said catalytic material.

6. The method of claim 5 wherein said oxidant comprises:

oxygen.

7. The method of claim 6 wherein said oxidant comprises:

hydrogen peroxide.

* * * * *

UNITED STATES PATENT AND TRADEMARK OFFICE
CERTIFICATE OF CORRECTION

PATENT NO. : 4,296,075

DATED : October 20, 1981

INVENTOR(S) : TSOUNG-YUAN YAN

It is certified that error appears in the above—identified patent and that said Letters Patent is hereby corrected as shown below:

Column 3, line 48, "predominatnt" should read --predominant--;
Column 5, line 6, "3" should read --1--;
Column 6, line 7, "6" should read --5--.

Signed and Sealed this

First Day of June 1982

[SEAL]

Attest:

GERALD J. MOSSINGHOFF

Attesting Officer     Commissioner of Patents and Trademarks